United States Patent
Takagi

(10) Patent No.: US 6,810,986 B2
(45) Date of Patent: Nov. 2, 2004

(54) ELECTRIC POWER STEERING APPARATUS AND CONTROL METHOD THEREFOR

(75) Inventor: Masanori Takagi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 59 days.

(21) Appl. No.: 10/385,153

(22) Filed: Mar. 10, 2003

(65) Prior Publication Data

US 2003/0178245 A1 Sep. 25, 2003

(30) Foreign Application Priority Data

Mar. 19, 2002 (JP) ........................................ 2002-077241

(51) Int. Cl.⁷ .............................................. B62D 5/04
(52) U.S. Cl. .................................................... 180/446
(58) Field of Search .......................... 318/727, 34, 139; 180/402–446; 701/41–43

(56) References Cited

U.S. PATENT DOCUMENTS

| | | | |
|---|---|---|---|
| 3,577,050 A | * 5/1971 | Ringland et al. | 318/146 |
| 4,581,569 A | * 4/1986 | Fujioka et al. | 318/811 |
| 4,674,588 A | * 6/1987 | Yasuda et al. | 180/412 |
| 4,837,692 A | * 6/1989 | Shimizu | 701/41 |
| 4,972,320 A | * 11/1990 | Sugiura et al. | 701/43 |
| 5,162,987 A | * 11/1992 | Sambhu | 700/42 |
| 5,194,794 A | * 3/1993 | Shamoto | 318/603 |
| 5,361,210 A | * 11/1994 | Fu | 701/41 |
| 5,631,529 A | * 5/1997 | Shimizu et al. | 318/432 |
| 5,670,854 A | * 9/1997 | Matsuura et al. | 318/432 |
| 5,701,066 A | * 12/1997 | Matsuura et al. | 318/808 |
| 5,729,102 A | * 3/1998 | Gotou et al. | 318/254 |
| 5,845,738 A | * 12/1998 | Nishino et al. | 180/443 |
| 6,123,163 A | * 9/2000 | Otsu et al. | 180/65.8 |
| 6,400,116 B1 | * 6/2002 | Chen et al. | 318/599 |
| 6,427,104 B1 | * 7/2002 | Matsushita et al. | 701/41 |
| 6,499,559 B2 | * 12/2002 | Mc Cann et al. | 180/446 |
| 6,683,427 B2 | * 1/2004 | Desbiolles et al. | 318/254 |
| 6,687,590 B2 | * 2/2004 | Kifuku et al. | 701/43 |
| 6,719,089 B2 | * 4/2004 | Yoneda et al. | 180/446 |
| 6,727,669 B2 | * 4/2004 | Suzuki et al. | 318/139 |

FOREIGN PATENT DOCUMENTS

| | | |
|---|---|---|
| DE | 100 65 190 | 6/2001 |
| DE | 100 31 215 | 10/2001 |

* cited by examiner

Primary Examiner—Lesley D. Morris
Assistant Examiner—Paul Royal, Jr.
(74) Attorney, Agent, or Firm—Merchant & Gould, P.C.

(57) ABSTRACT

In an electric power steering apparatus, a motor control unit repetitively performs PI control based on feedback of motor current signals and motor drive control based on an electrical angle of a three-phase brushless motor while appropriately skipping the PI control. Thus, an execution cycle time of the PI control is set to be longer than that of the motor drive control.

2 Claims, 3 Drawing Sheets

ELECTRIC POWER STEERING APPARATUS AND CONTROL METHOD THEREFOR

FIELD OF THE INVENTION

The present invention relates generally to electric power steering apparatus and method for controlling the electric power steering apparatus and, more particularly, to an improved electric power steering apparatus and control method therefor which can effectively reduce steering loads on a human operator to permit an enhanced steering feel by imparting a steering torque assist of an electric motor to the steering system of a motor vehicle such as a passenger car.

BACKGROUND OF THE INVENTION

The electric power steering apparatus are assistance apparatus to provide an automatic steering torque assist by activating a steering assisting motor in response to manual operation of a steering wheel by a human vehicle operator. In the electric power steering apparatus, the steering assisting motor is controlled by a motor control unit, using a steering torque signal output from a steering torque detector section that detects steering torque applied by the vehicle operator to a steering shaft and a vehicle velocity signal output from a vehicle velocity detector section, so as to reduce steering force to be manually applied by the vehicle operator. The motor control unit sets target values of motor currents to be supplied to the steering assisting motor, on the basis of the steering torque signal and vehicle velocity signal, and thereby generates target motor current signals representative of the thus-set target current values. Then, the motor control unit determines a difference or offset between the target motor current signals and motor current signals fed back from a motor current detector section that detects motor currents caused to actually flow through the steering assisting motor, and it then performs a proportional/integral compensation process (PI control) on the determined offset to thereby generate motor control signals for controlling the motor.

Among the conventional electric power steering apparatus is one employing a brushless steering assisting motor, and such an electric power steering apparatus employing the brushless steering assisting motor (hereinafter also referred to as a "brushless motor") can afford a stable steering torque assist, because the absence of voltage drops between a brush and a commutator can prevent reduction and variation in motor output power. Further, since the brushless motor presents a smaller moment of inertia than the brush-equipped motor, the electric power steering apparatus with such a brushless motor can afford a good steering feel when the steering wheel is turned during high-speed straight travel of the vehicle.

With the electric power steering apparatus employing the brushless motor, it is necessary to control an electric current to be supplied to the motor in accordance with a current rotational angle of the motor. Thus, it has been conventional for the electric power steering apparatus to include, as a feedback-controlling detector unit, a rotational angle detector section for detecting a current rotational angle (electrical angle) of the motor, in addition to the motor current detector section. Output signals from the motor current detector section and rotational angle detector section are fed back to the motor control unit, which in turn generates motor control signals for driving the brushless motor on the basis of PWM (Pulse Width Modulation) control (i.e., PWM-driving the brushless motor) in accordance with the motor currents and rotational angle. Here, the "rotational angle", i.e. "electrical angle", of the steering assisting motor is a rotational angle of a rotor detected via magnets provided on the rotor and a magnetism-detecting element provided near the magnet and on the basis of positions of the magnets. Specifically, at an end of the rotor, there are provided a plurality of (e.g., four) magnets, each presenting a pair of N and S magnetic poles, along the circumference of the rotor in such a manner that eight N and S poles are arranged alternately at equal intervals along the circumference of a predetermined portion of the rotor. As the rotor of the steering assisting motor rotates, magnetism produced by the N and S poles alternately acts on the magnetism-detecting element. In the electric power steering apparatus thus constructed, each full rotation of the rotor through a 360° mechanical angle produces an electrical angle of four cycles; that is, each quarter turn of the rotor corresponds to a 360° electrical angle. Rotational position of the rotor is determined by the electrical angle, and the phases of the motor currents to be supplied to the brushless motor are controlled with reference to the electrical angle.

In the electric power steering apparatus employing the brushless motor, the feedback-based motor control processing carried out by the motor control unit comprises for major steps of: (1) detecting an electrical angle of the rotor; (2) detecting motor currents (e.g., three-phase motor currents) and performing three-phase-to-two-phase conversion (three-phase-to-dq conversion) of the detected motor currents; (3) performing PI control; and (4) performing two-phase-to-three-phase conversion (dq-to-three-phase conversion). These four steps can be further classified into a first group of steps pertaining to feedback control of the motor currents (step (2) and step (3)), and a second group of steps pertaining to control for generating motor control signals using the detected electrical angle (step (1) and step (4)). The motor control unit is implemented by a microcomputer, and thus the four major steps of the feedback-based motor control processing is executed on the basis of computer software.

If the microcomputer (CPU) of the motor control unit is a high-performance microcomputer capable of operating at high speed, the above-mentioned four major steps can always be executed appropriately with no inconveniences even when the steering assisting motor rotates at high speed. However, if the microcomputer (CPU) is of relatively low performance and only capable of operating at low speed, then there would arise the problem that, when the steering assisting motor rotates at high speed, the three-phase sinusoidal waveforms of the motor control signals would deform considerably so that the motor control performance is undesirably lowered.

SUMMARY OF THE INVENTION

In view of the foregoing prior art problems, it is an object of the present invention to provide an improved electric power steering apparatus equipped with a brushless steering assisting motor and control method therefor which can reliably avoid degradation in motor control performance even where a microcomputer of low operating speed is employed in a motor control unit.

In order to accomplish the above-mentioned object, the present invention provides an electric power steering apparatus which includes, as a steering assisting motor, a brushless motor capable of being PWM-driven with motor currents of at least three phases to give a steering torque assist to a steering system of a motor vehicle. The electric power steering apparatus of the present invention further comprises: a steering torque detector section for detecting steering torque applied through operation of a steering wheel and generating a steering torque signal indicative of the detected steering torque; a target current setting section for setting target currents on the basis of at least the steering torque signal generated by the steering torque detector section; a motor current detection section for detecting the motor currents to be supplied to the brushless motor and generating motor current signals indicative of the detected motor currents; an electrical angle detector section (rotational angle detection section) for detecting an electrical angle of the brushless motor and generating an electrical angle signal indicative of the detected electrical angle; a motor control unit. The motor control unit comprises: an offset calculation section for calculating offsets between the target currents and the motor currents on the basis of the motor current signals and generating offset signals indicative of the calculated offsets; a first control section for reading the motor current signals generated by the motor current detector section, performing three-phase-to-two-phase conversion on the motor current signals and performing PI control on the offset signals (i.e., PI control based on feedback of the motor current signals); and a second control section for reading the electrical angle signal generated by the electrical angle detection section, performing two-phase-to-three-phase conversion, using the electrical angle signal, to generate motor control signals and, on the basis of the motor control signals, generating the motor currents for driving the brushless motor (i.e., motor drive control based on the electrical angle). Also, in the present invention, an execution cycle time (i.e., interval of time between the occurrence of corresponding portions of repetitively-executed processing cycles) of the control (i.e., PI control based on feedback of the motor current signals) by the first control section is set to be longer than an execution cycle time of the control (i.e., PI control based on feedback of the motor current signals) by the second control section.

The present invention also provides a control method for use with an electric power steering apparatus which detects steering torque applied through operation of a steering wheel, sets target currents on the basis of the detected steering torque, generates motor control signals by detecting and feeding back motor currents, to be supplied to a brushless motor, for comparison to the target currents and then PWM-drives the brushless motor with motor currents of at least three phases in accordance with the motor control signals, the electric power steering apparatus including a motor current detection section for detecting the motor currents to be supplied to the brushless motor and generating motor current signals indicative of the detected motor currents, an electrical angle detection section for detecting an electrical angle of the brushless motor and generating an electrical angle signal indicative of the detected electrical angle, and an offset calculation section for calculating offsets between the target currents and the motor currents and generating offset signals indicative of the calculated offsets. The control method of the present invention comprises: a first step of reading the electrical angle signal generated by the electrical angle detection section; a second step of reading the motor current signals generated by the motor current detector section and performing three-phase-to-two-phase conversion on the motor current signals; a third step of calculating the offset signals by means of the offset calculation section using the motor current signals read by the second step and then performing PI control on the offset signals; and a fourth step of performing two-phase-to-three-phase conversion using the electrical angle signal, read by the first step, to thereby generate the motor control signals and then generate the motor currents. Also, in the present invention, control processing including the first step to the fourth step is executed repetitively with a relatively long cycle time within a range that would not cause inconveniences, and simplified control processing including only the first step and the fourth step is executed repetitively during a period between the repetitive executions of the control processing.

Namely, according to the present invention, the motor control unit repetitively performs the PI control based on the basis of feedback of the motor current signals (the first control section, or the second and third steps) and the motor drive control (the second control section, or the first and fourth steps) while appropriately skipping the PI control. Such inventive arrangements can effectively lessen processing loads on the current feedback control elements of the motor control unit, implemented by a microcomputer, and prevent undesired waveform deformation of the sinusoidal three-phase motor currents to be supplied to the steering-assisting brushless motor during high-speed motor rotation. By thus substantially extending the cycle time of the current feedback control portions, it is possible to lessen the processing loads on the microcomputer in the entire control of the electric power steering apparatus.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
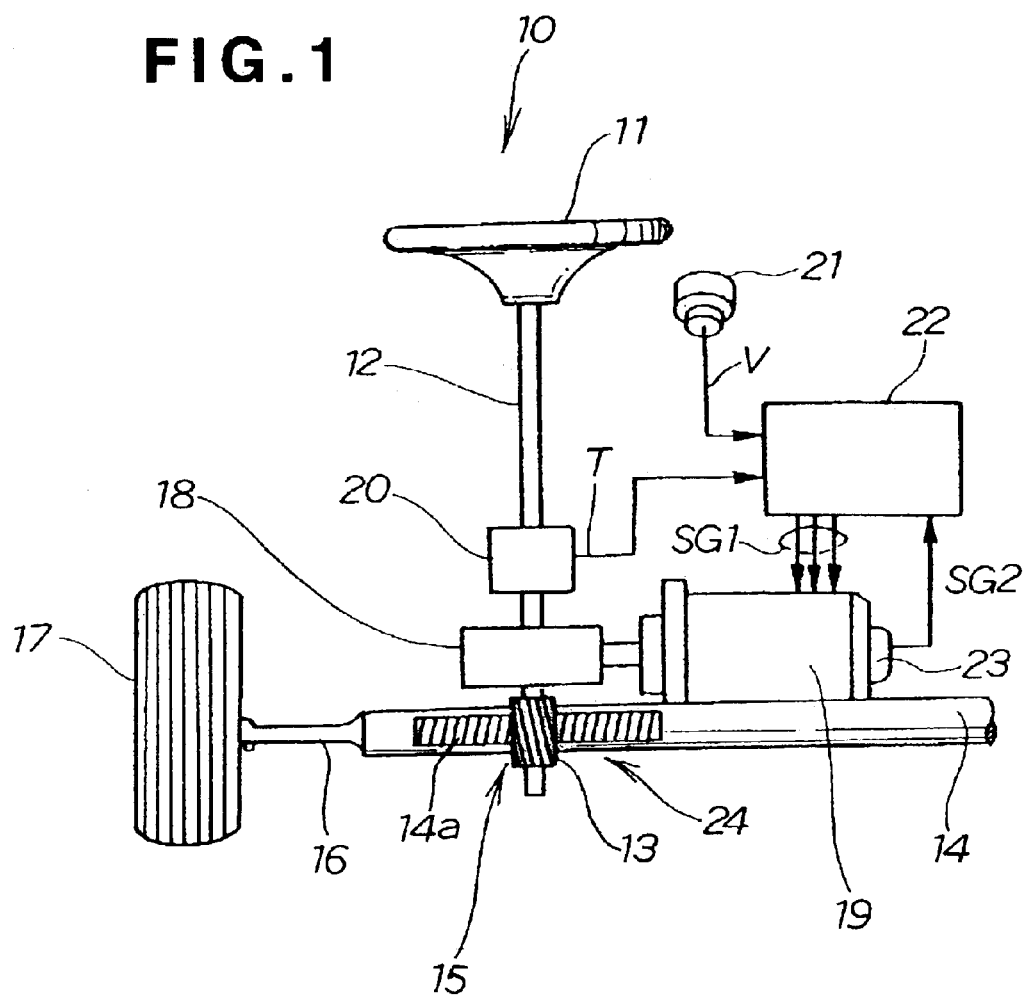
FIG. 1 is a front view showing a general setup of an electric power steering apparatus in accordance with an embodiment of the present invention.

Initial reference is made to FIG. 1 illustrating in front elevation a general setup of an electric power steering apparatus in accordance with an embodiment of the present invention. The electric power steering apparatus 10 of the present invention is employed in a motor vehicle such as a passenger car. It should be appreciated that embodiments of the present invention to be described below are just illustrative and the present invention may be modified variously without departing from the basic principles of the invention instead of being limited to the embodiments.

In FIG. 1, the electric power steering apparatus 10 is constructed to provide a steering torque assist (i.e., assisting steering torque) to a steering shaft 12 connected to a steering wheel 11. The steering shaft 12 has an upper end connected to the steering wheel 11 and a lower end where a pinion gear 13 is mounted. Rack gear 14a, meshingly engaging with the pinion gear 13, is provided on a rack shaft 14, and the pinion gear 13 and rack gear 14a together constitute a rack and pinion mechanism 15. Tie rods 16 (only one of which is shown in the figure) are provided at the opposite ends of the rack shaft 14, and front wheels 17 (only one of which is shown in the figure) are connected to the outer ends of the tie rods 16.

Further, in the electric power steering apparatus 10, a brushless steering assisting motor (hereinafter also referred to simply as "brushless motor") 19 is coupled with the steering shaft 12 via a power transmission mechanism 18. The brushless steering assisting motor 19 outputs rotational force (torque) to supplement manual steering torque applied by a human vehicle operator; the output rotational force of the motor 19 is transmitted via the power transmission mechanism 18 to the steering shaft 12. Steering torque detector section 20 is mounted on or in association with the steering shaft 12. The steering torque detector section 20 detects steering torque applied to the steering shaft 12 by the human vehicle operator manually steering the steering wheel 11. The electric power steering apparatus 10 also includes a vehicle velocity detector section 21 for detecting a traveling velocity of the vehicle, and a controller 22 implemented by a computer (e.g., microcomputer). The controller 22 receives a steering torque signal T generated by the steering torque detector section 20 and vehicle velocity signal V generated by the vehicle velocity detector section 21, so as to generate a drive control signal SG1 for controlling the rotation of the brushless motor 19 on the basis of steering torque information and vehicle velocity information represented by the received signals T and V. Further, a rotational angle detection section 23, comprising a resolver etc., is provided on or in association with the brushless motor 19, and a signal SG2 representative of a rotational angle (electrical angle) of the motor 19, generated by the rotational angle detection section 23 is supplied to the controller 22. The above-mentioned rack and pinion mechanism 15 is accommodated in a gearbox 24.

Briefly stated, the electric power steering apparatus 10 of the present invention is constructed by adding, to the basic construction of the conventional electric power steering apparatus, the above-mentioned steering torque detector section 20, vehicle velocity detector section 21, controller 22, brushless motor 19 and power transmission mechanism 18.

As the vehicle operator operates the steering wheel 11 to control the traveling direction of the vehicle, rotating force based on the manual steering torque applied to the steering shaft 12 is converted via the rack and pinion mechanism 15 into linear force to cause axial linear movement of the rack shaft 14 so that the steering direction of the front wheels 17 is changed via the tie rods 16 as instructed by the vehicle operator. At that time, the steering torque detector section 20 provided on or in association with the steering shaft 12 detects the steering torque applied to the steering wheel 11 by the vehicle operator, converts the detected steering torque into an electrical steering torque signal T, and supplies the steering torque signal T to the controller 22. The vehicle velocity detector section 21 detects a traveling velocity of the vehicle, converts the detected vehicle velocity into a vehicle velocity signal V, and supplies the vehicle velocity signal V to the controller 22.

In turn, the controller 22 generates motor currents of three phases (Iu, Iv and Iw) for driving the brushless motor 19, on the basis of the supplied steering torque signal T and vehicle velocity signal V. Namely, the brushless motor 19 employed in the instant embodiment is a three-phase brushless motor that is driven by the three-phase (U-, V-and W-phase) motor currents; note that the above-mentioned drive control signal SG1 consists of such three-phase motor currents Iu, Iv and Iw. The brushless motor 19 driven by the three-phase motor currents Iu, Iv and Iw applies a steering torque assist to the steering shaft 12 via the power transmission mechanism 18. With the brushless motor 19 thus driven, it is possible to reduce steering force to be manually applied to the steering wheel 11 by the vehicle operator.

Figure 2:
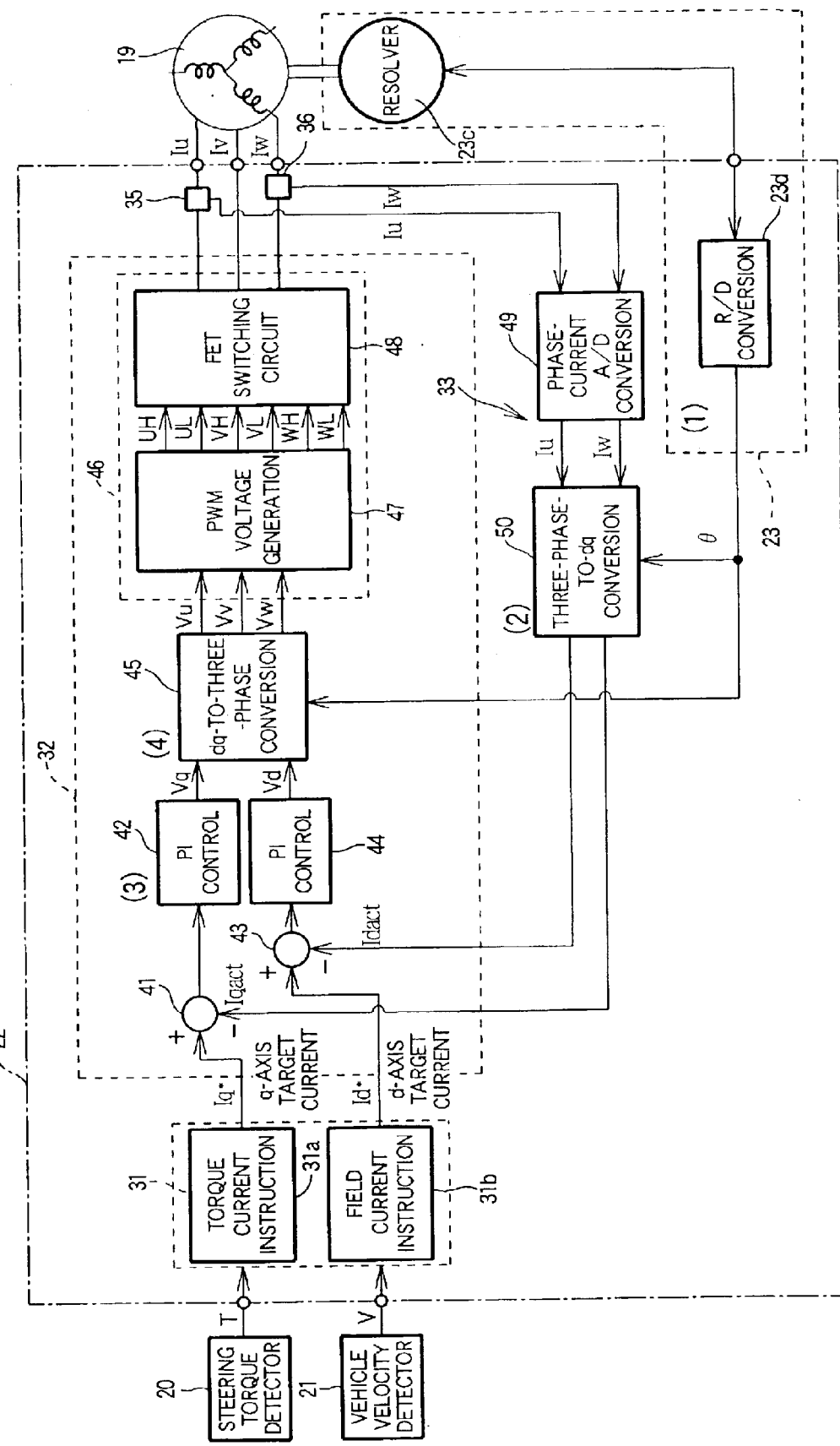
FIG. 2 is a block diagram showing an electric circuit structure of a controller employed in the electric power steering apparatus of FIG. 1.

The following paragraphs describe an exemplary detailed structure of the controller 22, with reference to FIG. 2. Specifically, FIG. 2 is a block diagram explanatory of an electric circuit structure for controlling torque of the three-phase brushless motor 19.

The controller 22 includes a target current setting section 31, motor control unit 32, feedback section 33 for feeding back signals representative of detected motor currents (i.e., motor current detection signals), and a rotational angle detection section 23 for detecting a current rotational angle (or electrical angle) of the motor 19. Because it is necessary to control motor currents to be supplied to the three-phase brushless motor 19 in accordance with an electrical angle of the rotor (rotation shaft) of the motor 19, the controller 22 includes motor current detector sections 35 and 36 for detecting supplied amounts of, for example, two of the three-phase motor currents Iu, Iv and Iw, as well as the rotational angle detection section 23 for detecting a current electrical angle. The three-phase brushless motor 19 is PWM-driven on the basis of the outputs from the target current setting section 31 and motor control unit 32 and using the detection signals output from the rotational angle detection section 23 and two motor current detector sections 35 and 36.

The rotational angle detection section 23 for detecting a current electrical angle of the brushless motor 19 includes a resolver 23c provided on or in association with the motor 19, and an R/D (Resolver-to-Digital) conversion section 23d. The R/D conversion section 23d supplies an exciting current to the resolver 23c, and an output signal from the resolver 23c is supplied to the R/D conversion section 23d. On the basis of the output signal from the resolver 23c, the R/D conversion section 23d takes out an electrical angle signal (θ) representative of a rotational position of the rotor of the brushless motor 19.

Further, in the controller 22, the steering torque signal T output from the steering torque detector section 20 and the vehicle velocity signal V output from the vehicle velocity detector section 21 are input to the target current setting section 31, which includes a torque current (q-axis current) instruction section 31a and a field current (d-axis current) instruction section 31b. On the basis of the steering torque signal T and vehicle velocity signal V, the torque current (q-axis current) instruction section 31a and field current (d-axis current) instruction section 31b in the target current setting section 31 set and output a q-axis target current (Iq*) and d-axis target current (Id*), respectively.

In order to achieve high-speed and accurate torque response, the torque control of the three-phase brushless motor 19 in the instant embodiment is performed by the motor control unit 32 on the basis of vector control as will be set forth below. Torque of the three-phase brushless motor 19 is determined by the intensities (torque levels) and phases of the three-phase motor currents Iu, Iv and Iw. According to the vector control, the motor currents to be supplied to windings on the stator of the motor 19 are controlled independently for each of two current components: a magnetic flux current that produces a magnetic flux in a main magnetic flux direction established within the brushless motor 19; and a torque current that phase-leads the magnetic flux current by 90° and directly controls torque of the motor 19. The d- and q-axis coordinate system is defined within the brushless motor 19 subjected to the torque control based on the vector control. Specifically, the d-and q-axis coordinate system is defined as having the d axis (magnetic flux axis) extending in the main magnetic flux direction from a center point of a cross-sectional surface of a portion of the motor 19 including the rotation shaft and rotor toward the N poles of magnets and having the q axis (torque axis) in a direction that phase-leads the d axis by 90°. The above-mentioned magnetic flux current is defined as a current component that produces a magnetic field in the d-axis direction, i.e. d-axis current, while the above-mentioned torque current is defined as a current component that produces a magnetic field in the q-axis direction, i.e. q-axis current. The d-axis current (Id) and q-axis current (Iq) are related with the three-phase motor currents (U-phase, V-phase and W-phase currents Iu, Iv and Iw) by a well-known predetermined conversion formula, using a rotational angle of the main magnetic flux relative to the stator. The d-axis current and q-axis current are two-axis D.C. currents based on the d-and q-axis coordinate system. Therefore, in the vector control employed here, the three-phase motor currents Iu, Iv and Iw to be supplied to the brushless motor 19 are converted into two-axis D.C. currents Id and Iq based on the d-and q-axis coordinate system, and the motor control unit 32 performs control on the two-axis D.C. currents Id and Iq.

The above-mentioned q-axis target current Iq* and d-axis target current Id* generated and output from the target current setting section 31 give target values of the motor currents Iu, Iv and Iw to be supplied to the brushless motor 19. Specifically, the q-axis target current Iq* and d-axis target current Id* are passed to the motor control unit 32, where an offset calculation section 41 subtracts a fed-back motor current signal (q-axis motor current detection signal) Iqact from the q-axis target current Iq* to calculate an offset between the fed-back motor current signal and the q-axis target current Iq* and thereby generates an offset signal representative of the calculated offset. The offset signal thus generated by the offset calculation section 41 is supplied to a PI control section 41, which performs a PI compensation process on the offset signal and thereby outputs a q-axis target voltage Vq tracking the q-axis target current Iq*. Similarly, a fed-back motor current signal (d-axis motor current detection signal) Idact is subtracted from the d-axis target current Id* by an offset calculation section 43, so that an offset signal representative of the calculated offset is generated by the offset calculation section 43. The offset signal thus generated by the offset calculation section 43 is supplied to a PI control section 44, which performs a PI compensation process on the offset signal from the calculation section 43 and thereby outputs a d-axis target voltage Vd tracking the d-axis target current Id*. The q-and d-axis target voltages Vq and Vd are delivered to a dq-to-three-phase conversion section 45.

Although not specifically shown for convenience and clarity of illustration, an interference-preventing control section etc. are provided between the PI control sections 42, 44 and the dq-to-three-phase conversion section 45 to perform interference-preventing compensation control.

The dq-to-three-phase conversion section 45 converts the d-axis compensation target voltage Vd and q-axis compensation target voltage Vq into three-phase target voltages Vu, Vv and Vw, by carrying out a conversion process based on a converting expressions (Mathematical Expressions (1) and (2)) and using the electrical angle signal θ given from the R/D conversion section 23d. Namely, as clear from Expressions (1) and (2) below, target voltages Vu and Vw of two phases are first calculated, and then a target voltage Vv of the remaining phase is calculated using the first-calculated target voltages Vu and Vw. These three-phase target voltages Vu, Vv and Vw are given to a motor drive section 46.

$$\begin{pmatrix} Vu \\ Vw \end{pmatrix} = \sqrt{\frac{2}{3}} \begin{pmatrix} \sin\left(\theta + \frac{\pi}{2}\right) & \sin\theta \\ -\sin\left(\theta + \frac{\pi}{6}\right) & -\sin\left(\theta + \frac{2\pi}{3}\right) \end{pmatrix} \begin{pmatrix} v_d \\ v_q \end{pmatrix} \quad (1)$$

$$Vv = -Vu - Vw \quad (2)$$

The motor drive section 46 includes a PWM voltage generation section 47 and an FET switching circuit (inverter circuit) 48. The PWM voltage generation section 47 generates PWM-controlled voltage signals UH, UL, VH, VL and WH, WL corresponding to the three-phase target voltages Vu, Vv and Vw, and supplies the thus-generated PWM-controlled voltage signals to the FET switching circuit 48. The FET switching circuit 48 switches on or off FETs in accordance with the PWM-controlled voltage signals UH, UL, VH, VL and WH, WL to allow the three-phase motor currents Iu, Iv and Iw to flow through the brushless steering assisting motor 19.

As noted earlier, the motor current detector sections 35 and 36 are provided on two motor current paths of the three-phase motor current paths. These motor current detector sections 35 and 36 detect two motor currents Iu and Iw of the three-phase motor currents Iu, Iv and Iw to be supplied to the brushless motor 19, and gives the thus-detected motor currents Iu and Iw to a phase-current A/D conversion section 49 of the feedback section 33. The phase-current A/D conversion section 49 converts the analog motor currents Iu and Iw into digital values, and the motor currents Iu and Iw having been thus converted into digital values are delivered to a three-phase-to-dq conversion section (A.C.-to-D.C. conversion section) 50. The three-phase-to-dq conversion section 50 calculates a motor current of the remaining phase (motor current Iv) on the basis of the motor currents Iu and Iw, and converts the motor currents into two-phase d-axis and q-axis D.C. current Idact and Iqact using a conversion expression (Mathematical Expression (3)) and the electrical angle signal θ given from the R/D conversion section 23d. The d-axis D.C. current Idact and q-axis D.C. current Iqact correspond to the above-mentioned d-axis motor current detection signal and q-axis motor current detection signal.

$$\begin{pmatrix} Idact \\ Iqact \end{pmatrix} = \sqrt{2} \begin{pmatrix} -\sin\left(\theta + \frac{2\pi}{3}\right) & \sin\theta \\ \sin\left(\theta + \frac{\pi}{6}\right) & \sin\left(\theta + \frac{\pi}{2}\right) \end{pmatrix} \begin{pmatrix} Iu \\ Iw \end{pmatrix} \quad (3)$$

The d-axis motor current detection signal Idact output from the three-phase-to-dq conversion section 50 is fed back to the offset calculation section 43, while the q-axis motor current detection signal Iqact output from the three-phase-to-dq conversion section 50 is fed back to the offset calculation section 41.

The following paragraphs describe control functions of the motor control unit 32 for controlling the torque of the brushless motor 19 in the controller 22 constructed in the above-described manner. As noted above, the controller 22 is implemented by a computer, and primary control functions (i.e., functions performed by elements denoted in a former half portion of a broken-line block of the unit 32 in FIG. 2) of the motor control unit 32 are implemented by computer software. Namely, the overall control of the electric power steering apparatus 10 is performed by the controller 22 executing the software. The primary control functions of the motor control unit 32 can be broadly broken down into the following control steps:

control step (1) where the electrical angle signal θ generated by the rotational angle detection section 23 is read;

control step (2) where the motor currents are detected by the motor current detector sections 35 and 36 and phase-current A/D conversion section 49 and then the three-phase-to-two-phase conversion operation is performed by the three-phase-to-dq conversion section 50;

control step (3) where the offset calculation operations are performed by the offset calculation sections 41 and 43 and the feedback control operations are performed by the PI control sections 42 and 44; and control step (4) where the two-phase-to-three-phase conversion operation is performed by the dq-to-three-phase conversion section 45 using the electrical angle signal θ.

In FIG. 2, numerals (1), (2), (3) and (4) are denoted, within the broken-line block of the motor control unit 32, in correspondence with portions of the control unit 32 where control steps (1) to (4) are carried out in the mentioned order. The motor control unit 32 executes control steps (1) to (4) in the following manner.

Figure 3:
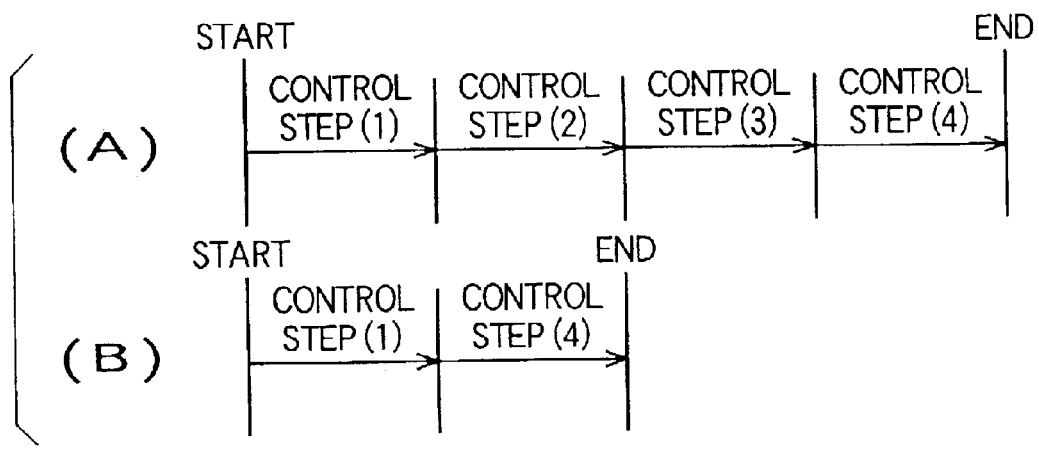
FIG. 3 is a diagram showing first and second basic control processing carried out by a motor control unit of the controller.

FIG. 3 shows two kinds of basic control processing (control schemes) A and B carried out by the motor control unit 32. The first basic control processing A is ordinary control processing where all of four control steps (1) to (4) briefed above are carried out in the mentioned order. The second basic control processing B is simplified control processing where only control steps (1) and (4) are executed in the mentioned order with control steps (2) and (3) skipped. Whereas it is essentially preferable that the first or ordinary basic control processing A is carried out repetitively, the motor control unit 32 in the instant embodiment is constructed to perform the entire control by appropriately combining the first and second basic control processing A and B in view of the performance of and processing loads on the computer.

In FIG. 3, the horizontal axis represents a time axis along which the first and second basic control processing A and B progresses as denoted by rightward arrows. Each of control steps (1) to (4) is shown in FIG. 3 as requiring a same time period, but, in fact, the required time period differs among the control steps. Normally, control steps (2) and (3) impose greater processing loads on the motor control unit 32, requiring longer processing times.

Figure 4:
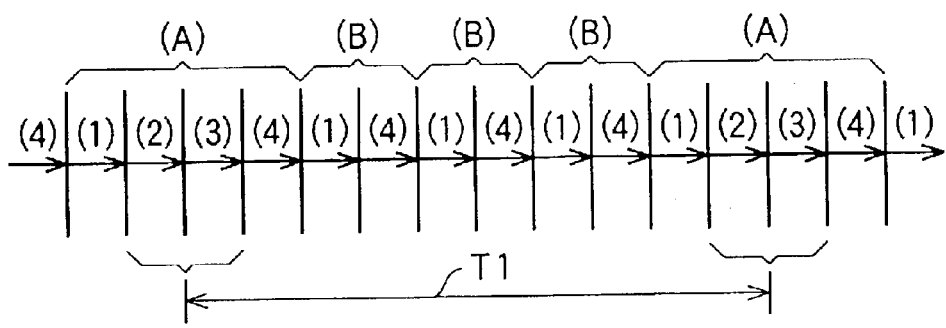
FIG. 4 is a diagram explanatory of the first and second basis control processing performed in the embodiment.

For these reasons, the motor control unit 32 in the instant embodiment is arranged, for example, to execute the second basic control processing B three times between repetitive executions of the first basic control processing A, as illustrated in FIG. 4. Namely, the overall control is constructed in such a manner that the first or ordinary basic control processing A is executed less frequently than the second or simplified basic control processing B, rather than always performing the ordinary basic control processing A alone. According to such a control method employed in the instant embodiment, control steps (2) and (3) are appropriately skipped during the repeated executions of the control so that an execution cycle time T1 (i.e., interval of time between the occurrence of corresponding portions of repetitively-executed processing cycles) of control steps (2) and (3) is substantially extended to be longer than an execution cycle time of control steps (1) and (4).

Figure 5:
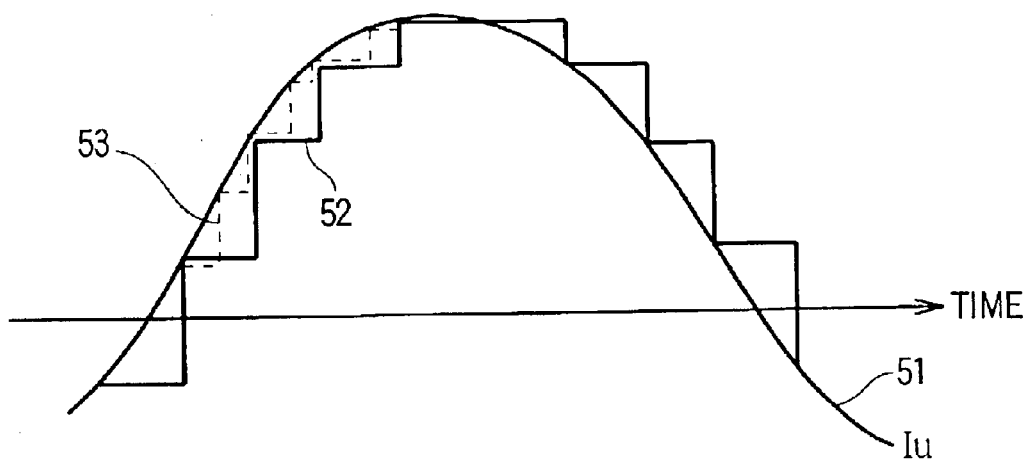
FIG. 5 is a diagram showing relationship between a U-phase motor current and the control processing performed in the embodiment.

FIG. 5 representatively shows the control method employed in the instant embodiment in relation to the motor current of the U phase. In FIG. 5, reference numeral 51 represents the U-phase motor current Iu of an ideal sine waveform, and a solid stepwise line 52 represents a case where the control is executed only with the ordinary basic control processing A while a broken stepwise line 53 represents a case where the control is executed with a combination of the ordinary basic control processing A and simplified basic control processing B. The case represented by the broken stepwise line 53 achieves higher follow ability to the U-phase motor current Iu because of the shorter execution cycle time. The case represented by the solid stepwise line 52 achieves poor followability to, or relatively great deviation from, the U-phase motor current Iu because of the longer execution cycle time. Therefore, in the instant embodiment, the control software is designed to perform the overall control of the electric power steering apparatus 10 in such a manner that the ordinary and simplified basic control processing A and B is combined appropriately with the execution cycle time of the ordinary basic control processing A extended to allow the characteristics of the solid stepwise line 53 to be readily obtained.

According to the control method of the present invention, the motor control unit 32 of the controller 22 repetitively performs the PI control based on the basis of feedback of the motor current signals and the motor drive control while appropriately skipping the PI control, so that processing loads on the motor current feedback elements of the motor control unit 32 can be reduced significantly.

The present disclosure relates to the subject matter of Japanese Patent Application No. 2002-077241, filed Mar. 19, 2002, the disclosure of which is expressly incorporated herein by reference in its entirety.

What is claimed is:

1. An electric power steering apparatus comprising:

a steering torque detector section detecting steering torque applied through operation of a steering wheel and generating a steering torque signal indicative of the detected steering torque;

a brushless motor capable of being PWM-driven with motor currents of at least three phases to give a steering torque assist to a steering system;

a target current setting section setting target currents on the basis of at least the steering torque signal generated by said steering torque detector section;

a motor current detection section detecting the motor currents to be supplied to said brushless motor and generating motor current signals indicative of the detected motor currents;

an electrical angle detection section detecting an electrical angle of said brushless motor and generating an electrical angle signal indicative of the detected electrical angle; and a motor control unit comprising:

an offset calculation section calculating offsets between the target currents and the motor currents on the basis of the motor current signals and generating offset signals indicative of the calculated offsets;

a first control section reading the motor current signals generated by said motor current detector section, performing three-phase-to-two-phase conversion on the motor current signals and performing PI control on the offset signals; and a second control section reading the electrical angle signal generated by said electrical angle detection section, performing two-phase-to-three-phase conversion, using the electrical angle signal, to generate motor control signals and, on the basis of the motor control signals, generating the motor currents for driving said brushless motor, wherein an execution cycle time of control by said first control section is set to be longer than an execution cycle time of control by said second control section.

2. A control method for use with an electric power steering apparatus which detects steering torque applied through operation of a steering wheel, sets target currents on the basis of the detected steering torque, generates motor control signals by detecting and feeding back motor currents, to be supplied to a brushless motor, for comparison to the target currents and then PWM-drives said brushless motor with motor currents of at least three phases in accordance with the motor control signals, said electric power steering apparatus including a motor current detection section for detecting the motor currents to be supplied to said brushless motor and generating motor current signals indicative of the detected motor currents, an electrical angle detection section for detecting an electrical angle of said brushless motor and generating an electrical angle signal indicative of the detected electrical angle, and an offset calculation section for calculating offsets between the target currents and the motor currents and generating offset signals indicative of the calculated offsets, said control method comprising:
a first step of reading the electrical angle signal generated by said electrical angle detection section;
a second step of reading the motor current signals generated by said motor current detector section and performing three-phase-to-two-phase conversion on the motor current signals;
a third step of calculating the offset signals by means of said offset calculation section using the motor current signals read by said second step and then performing PI control on the offset signals; and
a fourth step of performing two-phase-to-three-phase conversion using the electrical angle signal, read by said first step, to thereby generate the motor control signals and then generate the motor currents,
wherein control processing including said first step to said fourth step is executed repetitively with a predetermined cycle time, and simplified control processing including only said first step and said fourth step is executed repetitively during a period between repetitive executions of said control processing.

* * * * *